(12) United States Patent
Park et al.

(10) Patent No.: US 11,868,215 B2
(45) Date of Patent: Jan. 9, 2024

(54) OBJECT DATA BACKUP AND RECOVERY IN CLUSTERS MANAGING CONTAINERIZED APPLICATIONS

(71) Applicant: Rubrik, Inc., Palo Alto, CA (US)

(72) Inventors: Nohhyun Park, San Jose, CA (US); Abhishek Dharmapurikar, Mountain View, CA (US); Rajath Subramanyam, Santa Clara, CA (US); Gaurav Khandelwal, San Jose, CA (US); Pin Zhou, San Jose, CA (US)

(73) Assignee: Rubrik, Inc., Palo Alto, CA (US)

( * ) Notice: Subject to any disclaimer, the term of this patent is extended or adjusted under 35 U.S.C. 154(b) by 66 days.

(21) Appl. No.: 17/510,988

(22) Filed: Oct. 26, 2021

(65) Prior Publication Data

US 2023/0128602 A1   Apr. 27, 2023

(51) Int. Cl.
  *G06F 11/14*   (2006.01)
  *G06F 16/28*   (2019.01)
  *G06F 16/23*   (2019.01)

(52) U.S. Cl.
  CPC ...... *G06F 11/1464* (2013.01); *G06F 11/1451* (2013.01); *G06F 11/1469* (2013.01); *G06F 16/2358* (2019.01); *G06F 16/287* (2019.01); *G06F 16/288* (2019.01); *G06F 2201/80* (2013.01); *G06F 2201/84* (2013.01)

(58) Field of Classification Search
  CPC ............. G06F 11/1464; G06F 11/1451; G06F 11/1469; G06F 16/2358; G06F 16/287; G06F 16/288; G06F 2201/80; G06F 2201/84
  USPC ......................................................... 714/6.3
  See application file for complete search history.

(56) References Cited

U.S. PATENT DOCUMENTS

2019/0370123 A1*  12/2019  Heckel ............... G06F 11/1484
2020/0341855 A1*  10/2020  Tanwer ............... G06F 11/1464
2022/0308762 A1*   9/2022  Meadowcroft ....... G06F 3/0619

* cited by examiner

Primary Examiner — Yair Leibovich
(74) Attorney, Agent, or Firm — Holland & Hart LLP

(57) ABSTRACT

A object data backup and restore method and system include receiving a request to restore a target object to a first point-in-time version; identifying a first snapshot of the cluster corresponding to the first point-in-time version; generating a second snapshot of the cluster upon receiving the request to restore the target object; determining data changes associated with the target object based on the first snapshot and second snapshot; scanning all objects associated with the cluster to determine one or more additional objects that are affected by restoring the target object due to object dependencies defined by a cluster configuration; generating a relationship graph for the one or more additional objects and the target object; and restoring the target object based on the data changes, the first snapshot and the relationship graph.

20 Claims, 9 Drawing Sheets

OBJECT DATA BACKUP AND RECOVERY IN CLUSTERS MANAGING CONTAINERIZED APPLICATIONS

BACKGROUND

The volume and complexity of data that is collected, analyzed, and stored are increasing rapidly over time. The computer infrastructure used to handle this data is also becoming more complex, requiring increased data processing power and portability. As a result, data management and storage are becoming increasingly important. Significant issues include latency when processing a large volume of data during processes such as data ingestion, storage, export, and recovery. Significant issues include challenges of restoring data content of stateful objects in clusters that manage containerized workload and services, such as containerized applications.

BRIEF DESCRIPTION OF THE SEVERAL VIEWS OF THE DRAWINGS

Some embodiments are illustrated by way of example and not limited to the views of the accompanying drawing.

DETAILED DESCRIPTION

Figure 1A:
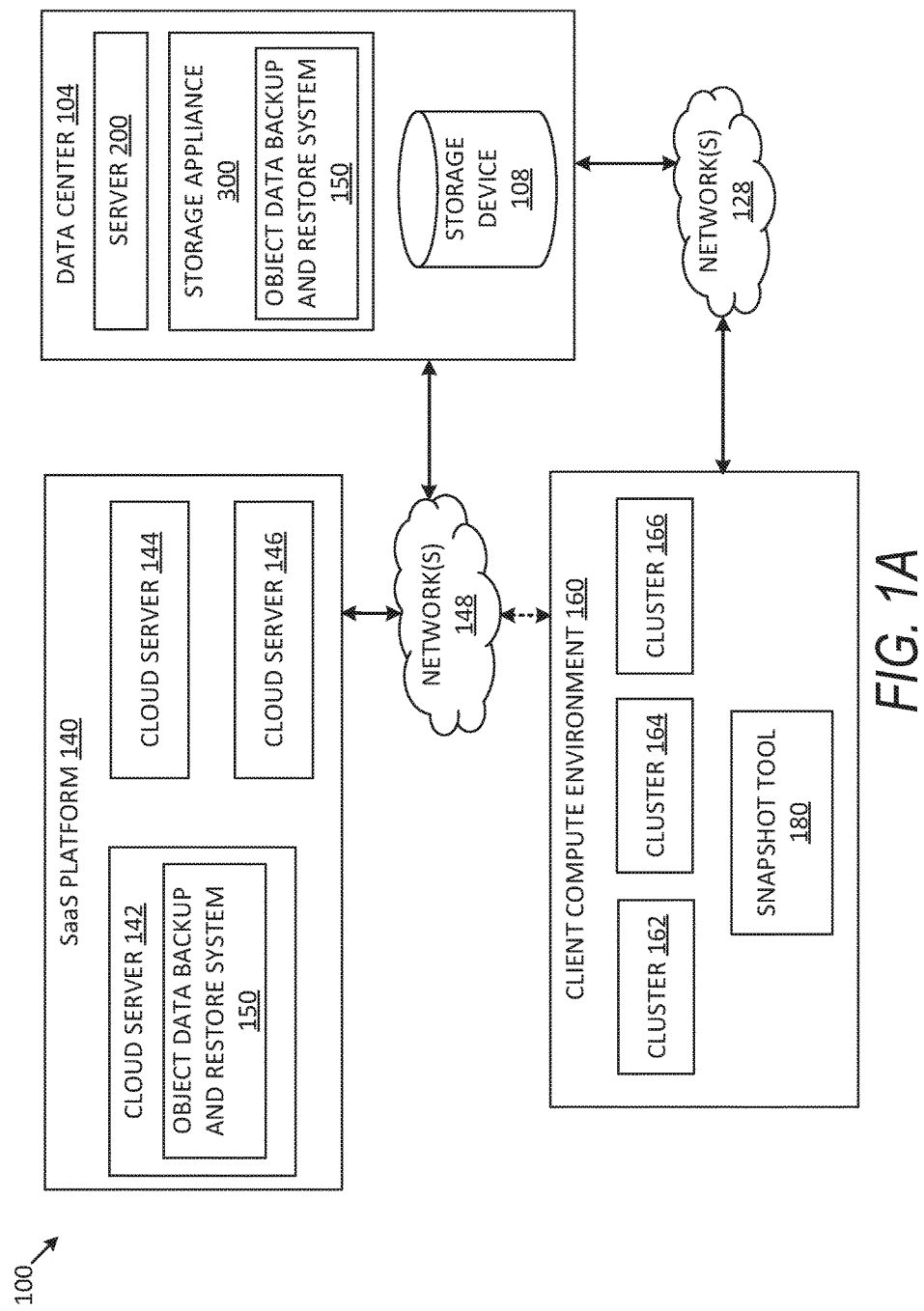
FIG. 1A depicts one embodiment of a networked computing environment in which the disclosed technology may be practiced, according to some embodiments.

The description that follows includes systems, methods, techniques, instruction sequences, and computing machine program products that embody illustrative embodiments of the present disclosure. In the following description, for purposes of explanation, numerous specific details are set forth in order to provide a thorough understanding of example embodiments. It will be evident, however, to one skilled in the art that the present inventive subject matter may be practiced without these specific details.

It will be appreciated that some of the examples disclosed herein are described in the context of virtual machines that are backed up by using base snapshots and incremental snapshots, for example. They should not necessarily be regarded as limitations of the disclosures. The disclosures, systems and methods described herein apply not only to virtual machines of all types that run a file system, but also to network-attached storage (NAS) devices, physical machines, and databases. Data objects may be referred to as "objects" as described herein.

Existing systems face challenges in restoring data content of stateful objects in clusters that manage containerized workload and services, such as containerized applications. In some instances, during the restoration of objects in such clusters, only the storage volume of the data objects can be restored, whereas the storage content of the objects themselves may be lost due to the stateless nature of the containerized applications. Challenges also arise when an object specification is not sufficient to specify the data content of an object. Existing systems face challenges in restoring a single object without restoring all objects in a given cluster due to object dependencies.

Various embodiments described herein relate to an object data backup and restore system for data object backup and recovery that optimizes system performance and reduces system latency. Specifically, in various embodiments, the object data backup and restore system identifies data changes and the associated metadata of a single object (e.g., target object) in a cluster, and restores the target object to a requested point-in-time version based on the identified data changes and the associated metadata. A relationship graph may be generated based on the identified metadata of certain objects (e.g., additional objects) in addition to the target object in the cluster. The relationship graph represents object dependencies between the additional objects and the target object for purposes of data backup and restoration. The object dependencies may be defined by the cluster configuration.

The data changes of the target object may include changes made to the storage content of the target object. The storage content may also be referred to as "storage content data" or "content data." The associated metadata of the target object may include storage volume data (also referred to as "storage volume" or "volume data").

In various embodiments, the object data backup and restore system may reside in a Software-as-a-Service (SaaS) platform or may reside across the SaaS platform and a data center that is communicatively coupled to the SaaS platform. In the latter scenario, the SaaS platform communicates with a cluster that includes objects for restore via the data center. The SaaS platform includes one or more cloud servers and is accessible by users via a web browser.

In various embodiments, the target object may be associated with a cluster (e.g., a Kubernetes cluster) that manages containerized applications. In various embodiments, an object is an atomic data unit running in a cluster. A cluster can be associated with multiple objects, which are arranged according to a relationship graph based on the associated cluster configuration. In various embodiments, an instance of an object (e.g., a pod) represents one or more containers and can be associated with one or more nodes in a cluster.

In various embodiments, a cluster includes a variety of objects that are interconnected based on cluster configurations. Restore of an object (e.g., target object) may affect other objects (e.g., "additional objects") in the cluster due to the object dependencies provided by the cluster configurations. The object data backup and restore system may predict state change propagation (e.g., data changes) stemming from a localized state exchange and ensures that minimum data changes are propagated during the restoration of the target object. Specifically, in various embodiments, the object data backup and restore system receives a request from a SaaS platform to restore a target object in a cluster to a first point-in-time version. The object data backup and restore system identifies a first snapshot corresponding to the first point-in-time version of the node or the cluster. The first snapshot may be a base snapshot or an incremental snapshot of the node, sub-cluster, or cluster that includes the target object. The object data backup and restore system generates a second snapshot upon receiving the request to restore the target object to the first point-in-time version. The second snapshot may be a base snapshot or an incremental snapshot of the node, sub-cluster, or cluster that includes the target object. In various embodiments, generating the second snapshot at the time of the request is to capture one or more additional objects that are dependent on or depend on the target object due to the object dependencies. At the time of the restore, the object data backup and restore system restores the target object based on data associated with the target object from the first snapshot in conjunction with data associated with one or more additional objects from the second snapshot. In various embodiments, the object data backup and restore system determines data changes associated with the target object based on the first snapshot and second snapshot. In various embodiments, the data changes associated with the target object may be pre-determined and included in the request to restore the target object to a first point-in-time version. The request may be a user-generated request or a system-generated request. Data changes or localized changes of an object may be associated with object specification definitions in YAML or JSON format.

In various embodiments, the object data backup and restore system uses a snapshot tool to scan all the objects associated with the node or the cluster that contains the target object. Based on the scanning, the object data backup and restore system determines one or more additional data objects therein that are affected by the restoration of the object based on the relationship (or object dependencies) defined by the cluster configuration. The relationship of objects may be represented by various types of metadata. The first type of metadata may be a key or value pair (e.g., a label or a label selector). The key or value pair may be associated with the object at creation time and may be subsequently added and modified. The key or value pair allows users to identify attributes of the object for queries. The second type of metadata may be an object dependency indicator (e.g., owner reference) that represents ownership and dependency relationships between objects. In various embodiments, when an owner object is deleted, its dependent objects may be automatically deleted. The third type of metadata may be a directory indicator (e.g., volume mounts), representing the type of directory and for which object the directory (e.g., volume) is being mounted. A directory is accessible by containers in an object. The fourth type of metadata may be a delete option indicator (e.g., finalizer) that is used on a directory (e.g., volume) to prevent accidental deletion. In various embodiments, the delete option indicator can be used to ensure a specific action is taken before the associated object can be deleted. For example, when a user instructs a cluster to delete an object that has the delete option indicator specified for it, the object data backup and restore system may use a cluster API to mark the object for deletion, putting it in a read-only state. The object remains in a terminating state while the system executes the delete action defined by the delete option indicator. After the deletion is complete, the system removes the delete option indicator from the object. When the delete option indicator field is empty, the object data backup and restore system considers the deletion complete.

In various embodiments, the object data backup and restore system generates a relationship graph for the target object for restore and the one or more additional objects from in the node or the cluster. Due to the object dependencies, the object data backup and restore system may restore (or mutate) the additional objects that are affected by restoring the requested object (e.g., target object) in order to maintain the user specification configured for the cluster so that the object-level data recovery may be performed on the fly (e.g., little to no system downtime). For example, the object data backup and restore system may not change the container image of a first object (e.g., pod) because the object specification is associated with a second object (e.g., replicaset). Similarly, the object data backup and restore system may not replace a third object (e.g., Persistent Volume Claim, also referred to as "PVC") that is bound to the first object without first deleting the delete option indicator associated with the first object. A PVC may be a type of object that corresponds to a user request to consume resources on the cluster.

In various embodiments, the object data backup and restore system restores the target object based on the first snapshot and the relationship graph. The object data backup and restore system may use a snapshot tool to perform operations as described herein. The snapshot tool may be an agent or a data component installed in the cluster, usually within a client compute environment. The snapshot tool may include a number of data units. Each data unit is responsible for executing a particular type of operation. In various embodiments, the snapshot tool may reside within the object data backup and restore system, or alternatively, reside in a client environment that is communicatively coupled to the object data backup and restore system. The client compute environment may include a number of clusters, including one or more clusters that manage containerized applications, as discussed herein.

In various embodiments, a third snapshot is taken for the relationship graph that includes one or more additional objects and the target object. The object data backup and restore system uses the snapshot tool to apply the data changes to the third snapshot, and restores the target object based on the modified third snapshot. The object data backup and restore system also restores the relationship graph so that the user specification is maintained for every object in the relationship graph during the restoration of the target object.

Reference will now be made in detail to embodiments of the present disclosure, examples of which are illustrated in the appended drawings. The present disclosure may, however, be embodied in many different forms and should not be construed as being limited to the embodiments set forth herein.

FIG. 1A depicts one embodiment of a networked computing environment 100 in which the disclosed technology may be practiced. As depicted, the networked computing environment 100 includes a SaaS platform 140, data center 104, a client compute environment 160, one or more networks 128, and one or more networks 148. The SaaS platform 140 and the data center 104 are in communication via one or more networks 148. The data center 104 and the client compute environment 160 are in communication via one or more networks 128. In various embodiments, the SaaS platform 140 communicates directly with the client compute environment 160 via one or more networks 148. The networked computing environment 100 may also include a plurality of computing devices interconnected through one or more networks 128 and one or more networks 148. One or more networks 128 and one or more networks 148 may allow computing devices and/or storage devices to connect to and communicate with other computing devices and/or other storage devices. In some embodiments, the networked computing environment 100 may include other computing devices and/or other storage devices not shown. The other computing devices may include, for example, a mobile computing device, a non-mobile computing device, a server, a work-station, a laptop computer, a tablet computer, a desktop computer, or an information processing system. The other storage devices may include, for example, a storage area network storage device, a networked-attached storage device, a hard disk drive, a solid-state drive, or a data storage system.

The data center 104 may include one or more servers, such as server 200, in communication with one or more storage devices, such as storage device 108. One or more servers may also be in communication with one or more storage appliances, such as storage appliance 300. The server 200, storage device 108, and storage appliance 300 may be in communication with each other via a networking fabric connecting servers and data storage units within the data center 104 to each other. The storage appliance 300 may include a data management system for backing up virtual machines and files within a virtualized infrastructure. In various embodiments, the storage appliance 300 includes the object data backup and restore system 150 residing across the data center 104 and the SaaS platform 140 for managing object data backup and recovery in one or more clusters in the client compute environment 160.

Figure 3:
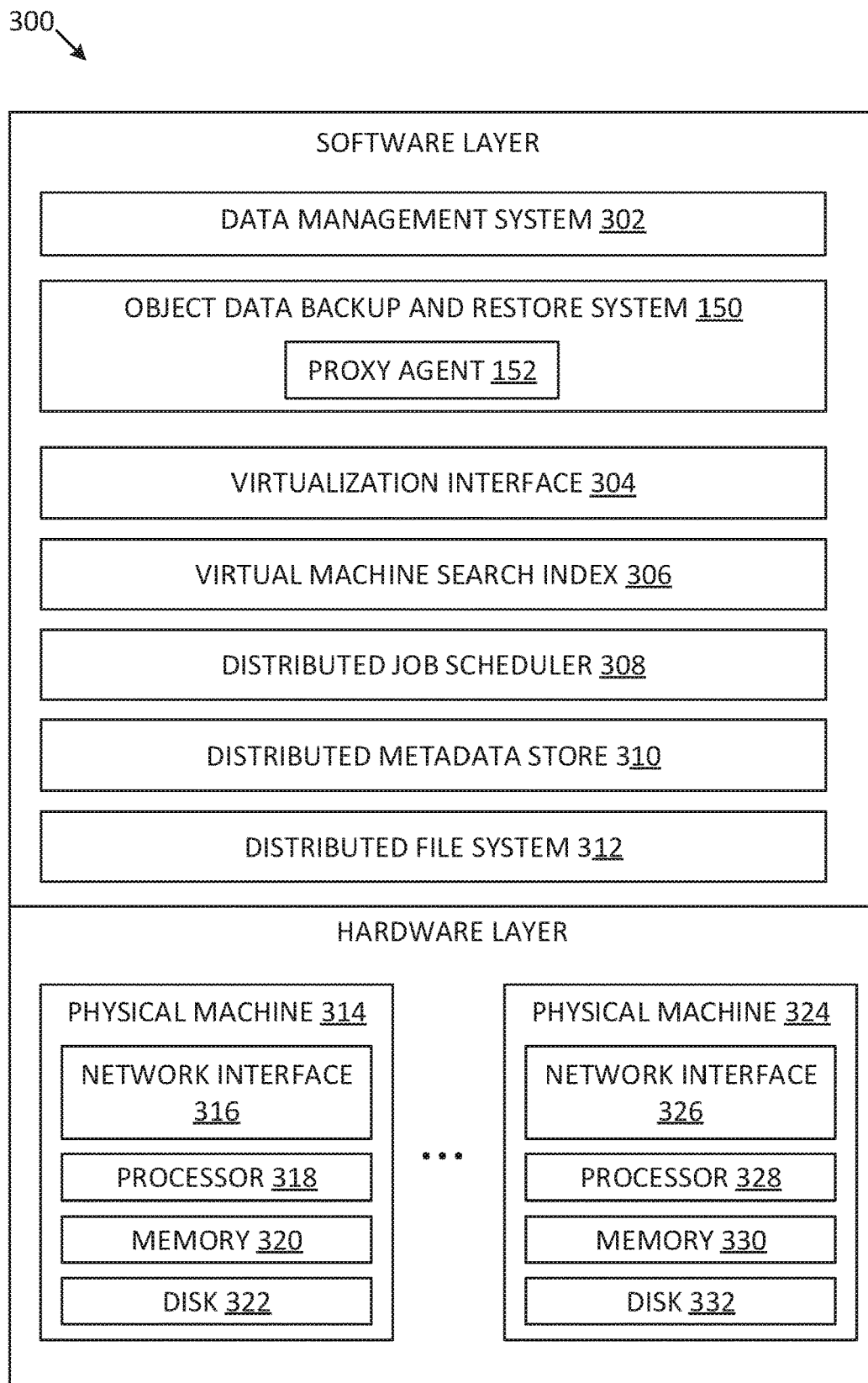
FIG. 3 depicts one embodiment of the storage appliance of FIG. 1A and FIG. 1B, according to some embodiments.

In various embodiments, the object data backup and restore system 150 residing across the data center 104, and the SaaS platform 140 may include a proxy agent 152 residing in the storage appliance 300 of the data center 104, as illustrated in FIG. 3. The proxy agent 152 may be a proxy server that translates and forwards instructions of various operations as described herein received from the SaaS platform 140 to the snapshot tool 180 for execution.

The SaaS platform 140 may include a number of cloud servers, such as cloud server 142, cloud server 144, and cloud server 146. The cloud servers are in communication with each other via one or more networks (not shown) and may be in communication with one or more storage devices (not shown). In various embodiments, the object data backup and restore system 150 may reside in one or more cloud servers, such as cloud server 142, as illustrated in FIG. 1A.

The client compute environment 160 may include a snapshot tool 180 and a number of clusters that manage containerized applications, such as cluster 162, cluster 164, and cluster 166, as illustrated in FIG. 1A. The snapshot tool 180 is in communication with the object data backup and restore system 150. In various embodiments, object data backup and restore system 150 instructs the snapshot tool via the proxy agent 152 to execute various operations as described in FIG. 5 and FIG. 6 in the client compute environment 160.

The one or more networks (e.g., networks 128 or networks 148) may include a secure network such as a private enterprise network, an unsecured network such as an open wireless network, a local area network (LAN), a wide area network (WAN), and the Internet. The one or more networks 128 or the one or more networks 148 may include a cellular network, a mobile network, a wireless network, or a wired network. Each network of the one or more networks 128 may include hubs, bridges, routers, switches, and wired transmission media such as a direct-wired connection. The one or more networks 128 or the one or more networks 148 may include an extranet or other private network for securely sharing information or providing controlled access to applications or files.

In various embodiments, the user interface may enable a user (e.g., a system administrator or a customer) of the SaaS platform 140 to identify a target object in a cluster within the client compute environment 160 for object data backup or restoration.

The networked computing environment 100 may provide a cloud computing environment for one or more computing devices. Cloud computing may refer to Internet-based computing, wherein shared resources, software, and/or information may be provided to one or more computing devices on-demand via the Internet. The networked computing environment 100 may comprise a cloud computing environment (e.g., SaaS platform 140) providing Software-as-a-Service (SaaS) or Infrastructure-as-a-Service (IaaS) services. SaaS may refer to a software distribution model in which applications are hosted by a service provider and made available to users over the Internet.

Figure 1B:
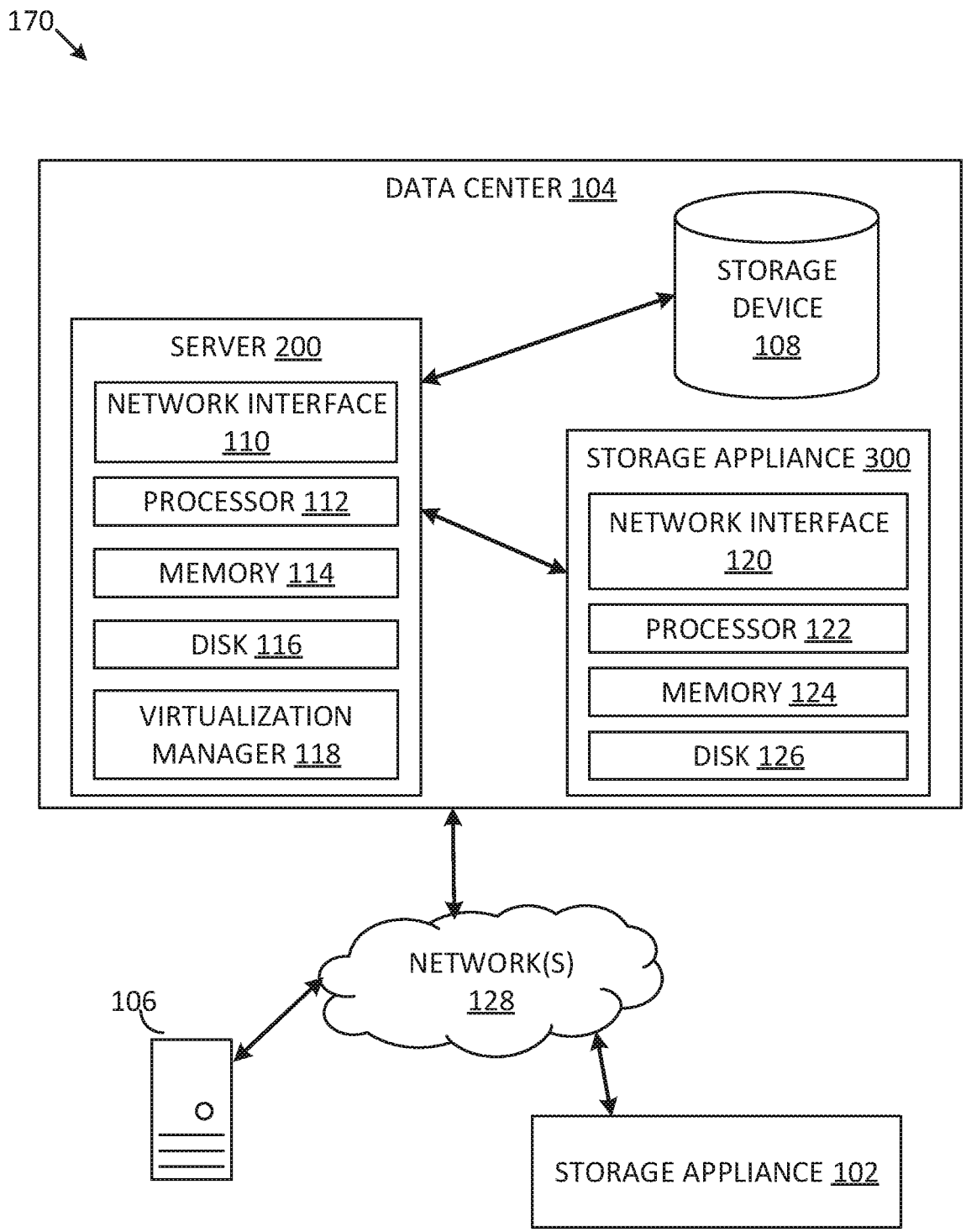
FIG. 1B depicts one embodiment of a networked computing environment of the data center of FIG. 1A, according to some embodiments.

FIG. 1B depicts one embodiment of a networked computing environment 170 of the data center 104 in which the disclosed technology may be practiced or be partially practiced. As depicted, the networked computing environment 170 includes a data center 104, a storage appliance 102, and a computing device 106 in communication with each other via one or more networks 128. The networked computing environment 170 may also include a plurality of computing devices interconnected through one or more networks 128. One or more networks 128 may allow computing devices and/or storage devices to connect to and communicate with other computing devices and/or other storage devices. In some embodiments, the networked computing environment 170 may include other computing devices and/or other storage devices not shown. The other computing devices may include, for example, a mobile computing device, a non-mobile computing device, a server, a work-station, a laptop computer, a tablet computer, a desktop computer, or an information processing system. The other storage devices may include, for example, a storage area network storage device, a networked-attached storage device, a hard disk drive, a solid-state drive, or a data storage system.

The data center 104 may include one or more servers, such as server 200, in communication with one or more storage devices, such as storage device 108. One or more servers may also be in communication with one or more storage appliances, such as storage appliance 102. The server 200, storage device 108, and storage appliance 300 may be in communication with each other via a networking fabric connecting servers and data storage units within the data center 104 to each other. In some embodiments, the server 200 may be used to create and manage one or more virtual machines associated with a virtualized infrastructure. In various embodiments, the data management system 302 may instead reside on server 200, or reside on both the storage appliance 300 and the server 200, in which case the data management system comprises a server module (not shown) in the server 200, and a storage appliance module (not shown) in the storage appliance 300. The server module and the storage appliance module communicate with each other to facilitate data backup and recovery operations, and other operations as described herein.

One or more virtual machines may run various applications, such as a database application or a web server. The storage device 108 may include one or more hardware storage devices for storing data, such as a hard disk drive (HDD), a magnetic tape drive, a solid-state drive (SSD), a storage area network (SAN) storage device, or a Networked-Attached Storage (NAS) device. In some embodiments, a data center, such as data center 104, may include thousands of servers and/or data storage devices in communication with each other. One or more data storage devices 108 may comprise a tiered data storage infrastructure (or a portion of a tiered data storage infrastructure). The tiered data storage infrastructure may allow for the movement of data across different tiers of a data storage infrastructure between higher-cost, higher-performance storage devices (e.g., solid-state drives and hard disk drives) and relatively lower-cost, lower-performance storage devices (e.g., magnetic tape drives).

A server, such as server 200, may allow a client to download information or files (e.g., executable, text, application, audio, image, or video files) from server 200 or to perform a search query related to particular information stored on the server 200. In some embodiments, a server may act as an application server or a file server. In general, server 200 may refer to a hardware device that acts as the host in a client-server relationship or a software process that shares a resource with or performs work for one or more clients.

One embodiment of server 200 includes a network interface 110, processor 112, memory 114, disk 116, and virtualization manager 118 all in communication with each other. Network interface 110 allows server 200 to connect to one or more networks 128. Network interface 110 may include a wireless network interface and/or a wired network interface. Processor 112 allows server 200 to execute non-transitory computer-readable instructions stored in memory 114 in order to perform processes described herein. Processor 112 may include one or more processing units, such as one or more CPUs and/or one or more GPUs. Memory 114 may comprise one or more types of memory (e.g., RAM, SRAM, DRAM, ROM, EEPROM, Flash, etc.). Disk 116 may include a hard disk drive and/or a solid-state drive. Memory 114 and disk 116 may comprise hardware storage devices.

The virtualization manager 118 may manage a virtualized infrastructure and perform management operations associated with the virtualized infrastructure. The virtualization manager 118 may manage the provisioning of virtual machines running within the virtualized infrastructure and provide an interface to computing devices interacting with the virtualized infrastructure. In one example, the virtualization manager 118 may set a virtual machine having a virtual disk into a frozen state in response to a snapshot request made via an application programming interface (API) by a storage appliance, such as storage appliance 300. Setting the virtual machine into a frozen state may allow a snapshot of the virtual machine to be stored or transferred. In one example, updates made to a virtual machine that has been set into a frozen state may be written to a separate file (e.g., an update file), while the virtual disk may be set into a read-only state to prevent modifications to the virtual disk file while the virtual machine is in the frozen state.

The virtualization manager 118 may then transfer backup data associated with the virtual machine to a storage appliance (e.g., a storage appliance 102 or storage appliance 300 as described further below) in response to a request made by a user via the storage appliance. For example, the backup data may include a snapshot of the virtual machine. A base snapshot may be generated based on a complete image of the virtual machine. An incremental snapshot may be generated based on a portion of the image of the virtual machine. The portion of the image may be a portion of the virtual disk files associated with the state of the virtual disk associated with the virtual machine at the point in time when the snapshot is taken.

In some embodiments, after the data associated with the point in time snapshot of the virtual machine has been transferred to the storage appliance 300, the virtual machine may be released from the frozen (e.g., unfrozen) state and the data updates made to the virtual machine and stored in the separate file may be merged into the virtual disk file. The virtualization manager 118 may perform various virtual machine-related tasks, such as cloning virtual machines, creating new virtual machines, monitoring the state of virtual machines, moving virtual machines between physical hosts for load balancing purposes, and facilitating backups of virtual machines.

In some embodiments, the storage appliance 300 and storage appliance 102 each includes a network interface 120, processor 122, memory 124, and disk 126 all in communication with each other. Network interface 120 allows storage appliance 300 to connect to one or more networks 128. Network interface 120 may include a wireless network interface and/or a wired network interface. Processor 122 allows storage appliance 300 to execute non-transitory computer-readable instructions stored in memory 124 in order to perform processes described herein. Processor 122 may include one or more processing units, such as one or more CPUs and/or one or more GPUs. Memory 124 may comprise one or more types of memory (e.g., RAM, SRAM, DRAM, ROM, EEPROM, NOR Flash, NAND Flash, etc.). Disk 126 may include a hard disk drive and/or a solid-state drive. Memory 124 and disk 126 may comprise hardware storage devices.

In some embodiments, the storage appliance 300 may include four machines. Each of the four machines may include a multi-core CPU, 64 GB of RAM, a 400 GB SSD, three 4 TB HDDs, and a network interface controller. In this case, the four machines may be in communication with one or more networks 128 via the four network interface controllers. The four machines may comprise four nodes of a server cluster. The server cluster may comprise a set of physical machines that are connected together via a network. The server cluster may be used for storing data associated with a plurality of virtual machines, such as backup data associated with different point-in-time versions of the virtual machines.

In some embodiments, the networked computing environment 170 may include a virtualized infrastructure that provides software, data processing, and/or data storage services to users accessing the services via the networked computing environment 170. In one example, networked computing environment 170 may provide cloud-based work productivity or business-related applications to a computing device, such as computing device 106. The storage appliance 102 may comprise a cloud-based data management system for backing up virtual machines and/or files within a virtualized infrastructure, such as virtual machines running on server 200/or files stored on server 200.

In some embodiments, networked computing environment 170 may provide remote access to secure applications and files stored within data center 104 from a remote computing device, such as computing device 106. The data center 104 may use an access control application to manage remote access to protected resources, such as protected applications, databases, or files located within the data center 104. To facilitate remote access to secure applications and files, a secure network connection may be established using a virtual private network (VPN). A VPN connection may allow a remote computing device, such as computing device 106, to securely access data from a private network (e.g., from a company file server or mail server) using an unsecured public network or the Internet. The VPN connection may require client-side software (e.g., running on the remote computing device) to establish and maintain the VPN connection. The VPN client software may provide data encryption and encapsulation prior to the transmission of secure private network traffic through the Internet.

In some embodiments, the storage appliance 300 may manage the extraction and storage of virtual machine snapshots associated with different versions of one or more virtual machines running within the data center 104. A snapshot of a virtual machine may correspond with a state of the virtual machine at a particular point in time. In response to a restore command from the storage device 108, the storage appliance 300 may restore a point-in-time version of a virtual machine (e.g., base snapshot) or restore point-in-time versions of one or more disk files located on the virtual machine (e.g., incremental snapshot) and transmit the restored data to the server 200. To improve storage density, the storage appliance 300 may deduplicate and compress data associated with different versions of a virtual machine and/or deduplicate and compress data associated with different virtual machines. To improve system performance, the storage appliance 300 may first store virtual machine snapshots received from a virtualized environment in a cache, such as a flash-based cache. The cache may also store popular data or frequently accessed data (e.g., based on a history of virtual machine restorations, incremental files associated with commonly restored virtual machine versions) and current day incremental files or incremental files corresponding with snapshots captured within the past 24 hours.

An incremental file may comprise a forward incremental file or a reverse incremental file. A forward incremental file may include a set of data representing changes that have occurred since an earlier point-in-time snapshot of a virtual machine. To generate a snapshot of the virtual machine corresponding with a forward incremental file, the forward incremental file may be combined with an earlier point in time snapshot of the virtual machine (e.g., the forward incremental file may be combined with the last full image of the virtual machine that was captured before the forward incremental file was captured and any other forward incremental files that were captured subsequent to the last full image and prior to the forward incremental file). A reverse incremental file may include a set of data representing changes from a later point-in-time snapshot of a virtual machine. To generate a snapshot of the virtual machine corresponding with a reverse incremental file, the reverse incremental file may be combined with a later point-in-time snapshot of the virtual machine (e.g., the reverse incremental file may be combined with the most recent snapshot of the virtual machine and any other reverse incremental files that were captured prior to the most recent snapshot and subsequent to the reverse incremental file).

The storage appliance 300 may provide a user interface (e.g., a web-based interface or a graphical user interface) that displays virtual machine backup information such as identifications of the protected virtual machines and the historical versions or time machine views for each of the protected virtual machines. A time machine view of a virtual machine may include snapshots of the virtual machine over a plurality of points in time. Each snapshot may comprise the state of the virtual machine at a particular point in time. Each snapshot may correspond with a different version of the virtual machine (e.g., Version 1 of a virtual machine may correspond with the state of the virtual machine at a first point in time and Version 2 of the virtual machine may correspond with the state of the virtual machine at a second point in time subsequent to the first point in time).

The user interface may enable a user of the storage appliance 300 (e.g., a system administrator or a virtualization administrator) to select a particular version of a virtual machine to be restored or mounted. When a particular version of a virtual machine has been mounted, the particular version may be accessed by a client (e.g., a virtual machine, a physical machine, or a computing device) as if the particular version was local to the client. A mounted version of a virtual machine may correspond with a mount point directory (e.g., /snapshots/VM5Nersion23). In one example, the storage appliance 300 may run an NFS server and make the particular version (or a copy of the particular version) of the virtual machine accessible for reading and writing. The user of the storage appliance 300 may then select the particular version to be mounted and run an application (e.g., a data analytics application) using the mounted version of the virtual machine. In another example, the particular version may be mounted as an Internet Small Computer System Interface (iSCSI) target.

Figure 2:
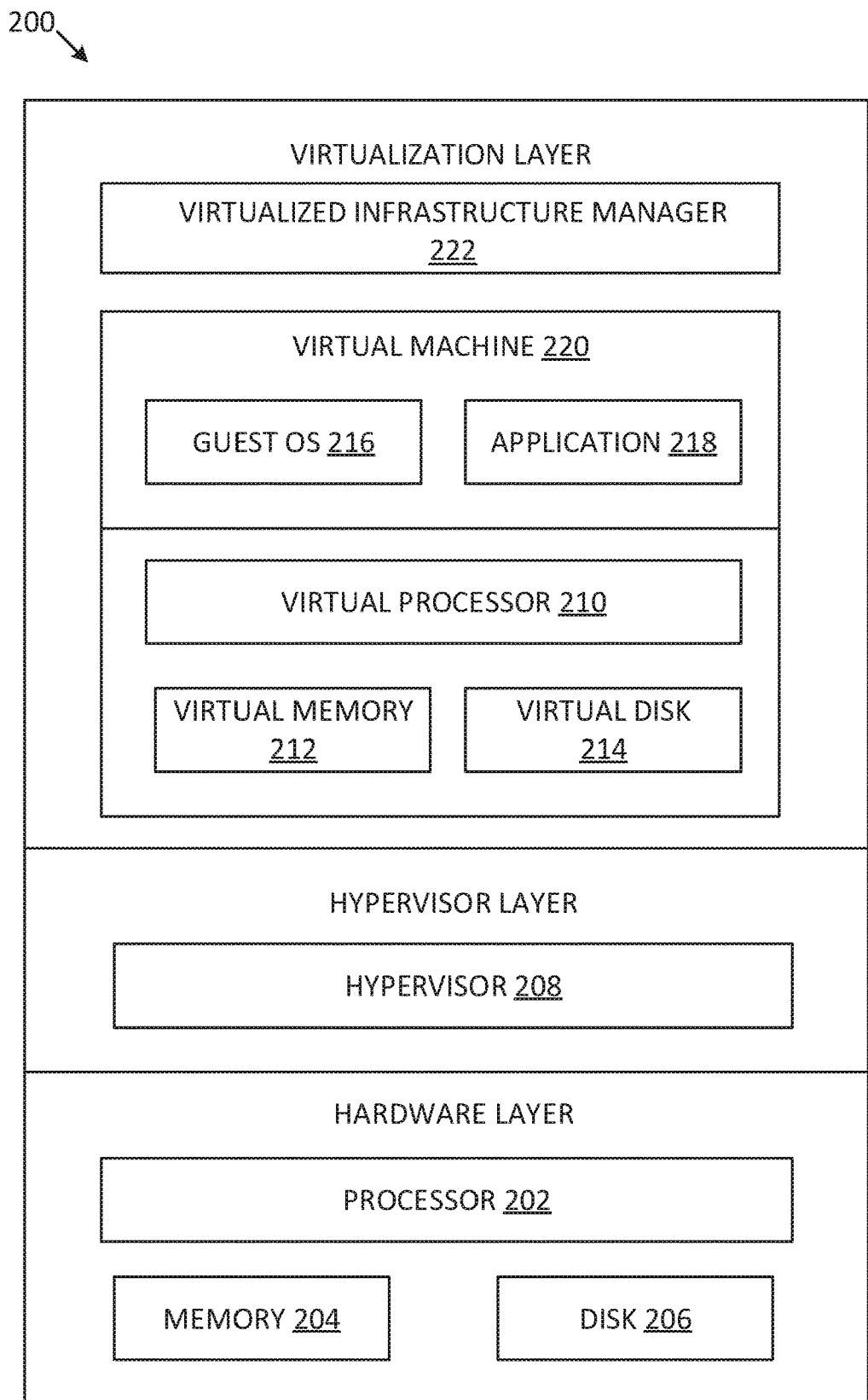
FIG. 2 depicts one embodiment of the server of FIG. 1A and FIG. 1B, according to some embodiments.

FIG. 2 depicts one embodiment of server 200 of FIG. 1A and FIG. 1B. The server 200 may comprise one server out of a plurality of servers that are networked together within a data center (e.g., data center 104). In one example, the plurality of servers may be positioned within one or more server racks within the data center. As depicted, server 200 includes hardware-level components and software-level components. The hardware-level components include one or more processors 202, one or more memory 204, and one or more disks 206. The software-level components include a hypervisor 208, a virtualized infrastructure manager 222, and one or more virtual machines, such as virtual machine 220. Hypervisor 208 may comprise a native hypervisor or a hosted hypervisor. The hypervisor 208 may provide a virtual operating platform for running one or more virtual machines, such as virtual machine 220. Virtual machine 220 includes a plurality of virtual hardware devices, including a virtual processor 210, a virtual memory 212, and a virtual disk 214. The virtual disk 214 may comprise a file stored within one or more disks 206. In one example, a virtual machine 220 may include a plurality of virtual disks 214, with each virtual disk of the plurality of virtual disks 214 associated with a different file stored on one or more disks 206. Virtual machine 220 may include a guest operating system 216 that runs one or more applications, such as application 218.

The virtualized infrastructure manager 222, which may correspond with the virtualization manager 118 in FIG. 1B, may run on a virtual machine or natively on the server 200. The virtual machine may, for example, be or include the virtual machine 220 or a virtual machine separate from the server 200. Other arrangements are possible. The virtualized infrastructure manager 222 may provide a centralized platform for managing a virtualized infrastructure that includes a plurality of virtual machines. The virtualized infrastructure manager 222 may manage the provisioning of virtual machines running within the virtualized infrastructure and provide an interface to computing devices interacting with the virtualized infrastructure. The virtualized infrastructure manager 222 may perform various virtualized infrastructure-related tasks, such as cloning virtual machines, creating new virtual machines, monitoring the state of virtual machines, and facilitating backups of virtual machines.

In some embodiments, server 200 may use the virtualized infrastructure manager 222 to facilitate backups for a plurality of virtual machines (e.g., eight different virtual machines) running on server 200. Each virtual machine running on server 200 may run its own guest operating system and its own set of applications. Each virtual machine running on the server 200 may store its own set of files using one or more virtual disks associated with the virtual machine (e.g., each virtual machine may include two virtual disks that are used for storing data associated with the virtual machine).

In some embodiments, a data management application running on a storage appliance, such as storage appliance 102 in FIG. 1B or storage appliance 300 in FIG. 1A and FIG. 1B, may request a snapshot of a virtual machine running on server 200. The snapshot of the virtual machine may be stored as one or more files, with each file associated with a virtual disk of the virtual machine. A snapshot of a virtual machine may correspond with a state (e.g., a point-in-time version) of the virtual machine at a particular point in time. The particular point in time may be associated with a time stamp. In one example, a first snapshot of a virtual machine may correspond with a first state of the virtual machine (including the state of applications and files stored on the virtual machine) at a first point in time and a second snapshot of the virtual machine may correspond with a second state of the virtual machine at a second point in time subsequent to the first point in time.

In response to a request for a snapshot of a virtual machine at a particular point in time, the virtualized infrastructure manager 222 may set the virtual machine into a frozen state or store a copy of the virtual machine at the particular point in time. The virtualized infrastructure manager 222 may then transfer data associated with the virtual machine (e.g., an image of the virtual machine or a portion of the image of the virtual machine) to the storage appliance 300 or storage appliance 102. The data (e.g., backup data) associated with the virtual machine may include a set of files, including a virtual disk file storing contents of a virtual disk of the virtual machine at the particular point in time and a virtual machine configuration file (e.g., database schema and database control logic data items) storing configuration settings for the virtual machine at the particular point in time. The contents of the virtual disk file may include the operating system used by the virtual machine, local applications stored on the virtual disk, and user files (e.g., images and word processing documents). In some embodiments, the virtualized infrastructure manager 222 may transfer a full image of the virtual machine to the storage appliance 102 or storage appliance 300 of FIG. 1B or a plurality of data blocks corresponding with the full image (e.g., to enable a full image-level backup of the virtual machine to be stored on the storage appliance). In other cases, the virtualized infrastructure manager 222 may transfer a portion of an image of the virtual machine associated with data that has changed since an earlier point in time prior to the particular point in time or since a last snapshot of the virtual machine was taken. In one example, the virtualized infrastructure manager 222 may transfer only data associated with virtual blocks stored on a virtual disk of the virtual machine that have changed since the last snapshot of the virtual machine was taken. In some embodiments, the data management application may specify a first point in time and a second point in time, and the virtualized infrastructure manager 222 may output one or more virtual data blocks that have been modified between the first point in time and the second point in time.

In some embodiments, the server 200 or the hypervisor 208 may communicate with a storage appliance, such as storage appliance 102 or storage appliance 300 in FIG. 1B, using a distributed file system protocol such as Network File System (NFS) Version 3, or Server Message Block (SMB) protocol. The distributed file system protocol may allow the server 200 or the hypervisor 208 to access, read, write, or modify files stored on the storage appliance as if the files were locally stored on the server 200. The distributed file system protocol (e.g., Network File System ("NFS") protocol) may allow the server 200 or the hypervisor 208 to mount a directory or a portion of a file system located within the storage appliance.

FIG. 3 depicts one embodiment of storage appliance 300 in FIG. 1A and FIG. 1B. The storage appliance may include a plurality of physical machines and virtual machines that may act in concert as a single computing system. Each physical machine of the plurality of physical machines may comprise a node in a cluster. In one example, the storage appliance may be positioned within a server rack within a data center. As depicted, the storage appliance 300 includes hardware-level components and software-level components. The hardware-level components include one or more physical machines, such as physical machine 314 and physical machine 324. The physical machine 314 includes a network interface 316, processor 318, memory 320, and disk 322, all in communication with each other. Processor 318 allows physical machine 314 to execute non-transitory computer-readable instructions stored in memory 320 to perform processes described herein. Disk 322 may include a hard disk drive and/or a solid-state drive. The physical machine 324 includes a network interface 326, processor 328, memory 330, and disk 332, all in communication with each other. Processor 328 allows physical machine 324 to execute computer-readable instructions stored in memory 330 to perform processes described herein. Disk 332 may include a hard disk drive and/or a solid-state drive. In some embodiments, disk 332 may include a flash-based SSD or a hybrid HDD/SSD drive. In some embodiments, the storage appliance 300 may include a plurality of physical machines arranged in a cluster (e.g., eight machines in a cluster). Each of the plurality of physical machines may include a plurality of multi-core CPUs, 108 GB of RAM, a 500 GB SSD, four 4 TB HDDs, and a network interface controller.

In some embodiments, the plurality of physical machines may be used to implement a cluster-based network file-server. The cluster-based network file server may neither require nor use a front-end load balancer. One issue with using a front-end load balancer to host the IP address for the cluster-based network file server and to forward requests to the nodes of the cluster-based network file server is that the front-end load balancer comprises a single point of failure for the cluster-based network file server. In some embodiments, the file system protocol is used by a server, such as server 200 in FIG. 1B, or a hypervisor, such as hypervisor 208 in FIG. 2, to communicate with the storage appliance 300, which may not provide a failover mechanism (e.g., NFS Version 3). In the case that no failover mechanism is provided on the client-side, the hypervisor may not be able to connect to a new node within a cluster in the event that the node connected to the hypervisor fails.

As depicted in FIG. 3, the software-level components of the storage appliance 300 may include data management system 302, a virtualization interface 304, a distributed job scheduler 308, a distributed metadata store 310, a distributed file system 312, and one or more virtual machine search indexes, such as virtual machine search index 306. The software-level components of the storage appliance 300 may further include the object data backup and restore system 150 that includes a proxy agent 152 in communication with the SaaS platform 140 and the snapshot tool 180 in the client compute environment 160. The proxy agent 152 may be a proxy server that processes and passes instructions from the SaaS platform 140 to the snapshot tool 180 to execute various operations in the client compute environment. Various operations include operations as described in FIG. 5 and FIG. 6.

In some embodiments, the software-level components of the storage appliance 300 may be run using a dedicated hardware-based appliance. In another embodiment, the software-level components of the storage appliance 300 may be run from the cloud (e.g., the software-level components may be installed on a cloud service provider).

The distributed file system 312 may present itself as a single file system, in which as new physical machines or nodes are added to the storage appliance 300, the cluster may automatically discover the additional nodes and automatically increase the available capacity of the file system for storing files and other data. Each file stored in the distributed file system 312 may be partitioned into one or more chunks or shards. Each of the one or more chunks may be stored within the distributed file system 312 as a separate file. The files stored within the distributed file system 312 may be replicated or mirrored over a plurality of physical machines, thereby creating a load-balanced and fault-tolerant distributed file system. In one example, storage appliance 300 may include ten physical machines arranged as a failover cluster and a first file corresponding with a snapshot of a virtual machine (e.g., /snapshots/VM_A/s1/s1.full) may be replicated and stored on three of the ten machines.

The distributed metadata store 310 may include a distributed database management system that provides high availability without a single point of failure. In some embodiments, the distributed metadata store 310 may comprise a database, such as a distributed document-oriented database. The distributed metadata store 310 may be used as a distributed key value storage system. In one example, the distributed metadata store 310 may comprise a distributed NoSQL key value store database. In some embodiments, the distributed metadata store 310 may include a partitioned row store, in which rows are organized into tables or other collections of related data held within a structured format within the key value store database. A table (or a set of tables) may be used to store metadata information associated with one or more files stored within the distributed file system 312. The metadata information may include the name of a file, a size of the file, file permissions associated with the file, when the file was last modified, and file mapping information associated with an identification of the location of the file stored within a cluster of physical machines. In some embodiments, a new file corresponding with a snapshot of a virtual machine may be stored within the distributed file system 312 and metadata associated with the new file may be stored within the distributed metadata store 310. The distributed metadata store 310 may also be used to store a backup schedule for the virtual machine and a list of snapshots for the virtual machine that is stored using the storage appliance 300.

In some embodiments, the distributed metadata store 310 may be used to manage one or more versions of a virtual machine. Each version of the virtual machine may correspond with a full image snapshot of the virtual machine stored within the distributed file system 312 or an incremental snapshot of the virtual machine (e.g., a forward incremental or reverse incremental) stored within the distributed file system 312. In some embodiments, one or more versions of the virtual machine may correspond with a plurality of files. The plurality of files may include a single full image snapshot of the virtual machine and one or more incremental aspects derived from the single full image snapshot. The single full image snapshot of the virtual machine may be stored using a first storage device of a first type (e.g., a HDD) and the one or more incremental aspects derived from the single full image snapshot may be stored using a second storage device of a second type (e.g., an SSD). In this case, only a single full image needs to be stored and each version of the virtual machine may be generated from the single full image or the single full image combined with a subset of the one or more incremental aspects. Furthermore, each version of the virtual machine may be generated by performing a sequential read from the first storage device (e.g., reading a single file from a HDD) to acquire the full image and, in parallel, performing one or more reads from the second storage device (e.g., performing fast random reads from an SSD) to acquire the one or more incremental aspects.

The distributed job scheduler 308 may be used for scheduling backup jobs that acquire and store virtual machine snapshots for one or more virtual machines over time. The distributed job scheduler 308 may follow a backup schedule to back up an entire image of a virtual machine at a particular point in time or one or more virtual disks associated with the virtual machine at a particular point in time. In one example, the backup schedule may specify that the virtual machine be backed up at a snapshot capture frequency, such as every two hours or every 24 hours. Each backup job may be associated with one or more tasks to be performed in a sequence. Each of the one or more tasks associated with a job may be run on a particular node within a cluster. In some embodiments, the distributed job scheduler 308 may schedule a specific job to be run on a particular node based on data stored on the particular node. For example, the distributed job scheduler 308 may schedule a virtual machine snapshot job to be run on a node in a cluster that is used to store snapshots of the virtual machine in order to reduce network congestion.

The distributed job scheduler 308 may comprise a distributed fault tolerant job scheduler, in which jobs affected by node failures are recovered and rescheduled to be run on available nodes. In some embodiments, the distributed job scheduler 308 may be fully decentralized and implemented without the existence of a master node. The distributed job scheduler 308 may run job scheduling processes on each node in a cluster or on a plurality of nodes in the cluster. In one example, the distributed job scheduler 308 may run a first set of job scheduling processes on a first node in the cluster, a second set of job scheduling processes on a second node in the cluster, and a third set of job scheduling processes on a third node in the cluster. The first set of job scheduling processes, the second set of job scheduling processes, and the third set of job scheduling processes may store information regarding jobs, schedules, and the states of jobs using a metadata store, such as distributed metadata store 310. In the event that the first node running the first set of job scheduling processes fails (e.g., due to a network failure or a physical machine failure), the states of the jobs managed by the first set of job scheduling processes may fail to be updated within a threshold period of time (e.g., a job may fail to be completed within 30 seconds or within minutes from being started). In response to detecting jobs that have failed to be updated within the threshold period of time, the distributed job scheduler 308 may undo and restart the failed jobs on available nodes within the cluster.

The job scheduling processes running on at least a plurality of nodes in a cluster (e.g., on each available node in the cluster) may manage the scheduling and execution of a plurality of jobs. The job scheduling processes may include run processes for running jobs, cleanup processes for cleaning up failed tasks, and rollback processes for rolling-back or undoing any actions or tasks performed by failed jobs. In some embodiments, the job scheduling processes may detect that a particular task for a particular job has failed and in response, may perform a cleanup process to clean up or remove the effects of the particular task and then perform a rollback process that processes one or more completed tasks for the particular job in reverse order to undo the effects of the one or more completed tasks. Once the particular job with the failed task has been undone, the job scheduling processes may restart the particular job on an available node in the cluster.

The distributed job scheduler 308 may manage a job in which a series of tasks associated with the job is to be performed atomically (i.e., partial execution of the series of tasks is not permitted). If the series of tasks cannot be completely executed or there is any failure that occurs to one of the series of tasks during execution (e.g., a hard disk associated with a physical machine fails or a network connection to the physical machine fails), then the state of a data management system may be returned to a state as if none of the series of tasks was ever performed. The series of tasks may correspond with an ordering of tasks for the series of tasks and the distributed job scheduler 308 may ensure that each task of the series of tasks is executed based on the ordering of tasks. Tasks that do not have dependencies with each other may be executed in parallel.

In some embodiments, the distributed job scheduler 308 may schedule each task of a series of tasks to be performed on a specific node in a cluster. In other cases, the distributed job scheduler 308 may schedule a first task of the series of tasks to be performed on a first node in a cluster and a second task of the series of tasks to be performed on a second node in the cluster. In these cases, the first task may have to operate on a first set of data (e.g., a first file stored in a file system) stored on the first node and the second task may have to operate on a second set of data (e.g., metadata related to the first file that is stored in a database) stored on the second node. In some embodiments, one or more tasks associated with a job may have an affinity to a specific node in a cluster.

In one example, if one or more tasks require access to a database that has been replicated on three nodes in a cluster, then the one or more tasks may be executed on one of the three nodes. In another example, if the one or more tasks require access to multiple chunks of data associated with a virtual disk that has been replicated over four nodes in a cluster, then the one or more tasks may be executed on one of the four nodes. Thus, the distributed job scheduler 308 may assign one or more tasks associated with a job to be executed on a particular node in a cluster based on the location of data to be accessed by the one or more tasks.

In some embodiments, the distributed job scheduler 308 may manage a first job associated with capturing and storing a snapshot of a virtual machine periodically (e.g., every 30 minutes). The first job may include one or more tasks, such as communicating with a virtualized infrastructure manager, such as the virtualized infrastructure manager 222 in FIG. 2, to create a frozen copy of the virtual machine and to transfer one or more chunks (or one or more files) associated with the frozen copy to a storage appliance, such as storage appliance 300 in FIG. 1A and FIG. 1B.

The virtualization interface 304 may provide an interface for communicating with a virtualized infrastructure manager managing a virtualization infrastructure, such as virtualized infrastructure manager 222 in FIG. 2, and requesting data associated with virtual machine snapshots from the virtualization infrastructure. The virtualization interface 304 may communicate with the virtualized infrastructure manager using an Application Programming Interface (API) for accessing the virtualized infrastructure manager (e.g., to communicate a request for a snapshot of a virtual machine). In this case, storage appliance 300 may request and receive data from a virtualized infrastructure without requiring agent software to be installed or running on virtual machines within the virtualized infrastructure. The virtualization interface 304 may request data associated with virtual blocks stored on a virtual disk of the virtual machine that have changed since a last snapshot of the virtual machine was taken or since a specified prior point in time. Therefore, in some cases, if a snapshot of a virtual machine is the first snapshot taken of the virtual machine, then a full image of the virtual machine may be transferred to the storage appliance. However, if the snapshot of the virtual machine is not the first snapshot taken of the virtual machine, then only the data blocks of the virtual machine that have changed since a prior snapshot was taken may be transferred to the storage appliance.

The virtual machine search index 306 may include a list of files that have been stored using a virtual machine and a version history for each of the files in the list. Each version of a file may be mapped to the earliest point-in-time snapshot of the virtual machine that includes the version of the file or to a snapshot of the virtual machine that includes the version of the file (e.g., the latest point in time snapshot of the virtual machine that includes the version of the file). In one example, the virtual machine search index 306 may be used to identify a version of the virtual machine that includes a particular version of a file (e.g., a particular version of a database, a spreadsheet, or a word processing document). In some embodiments, each of the virtual machines that are backed up or protected using storage appliance 300 may have a corresponding virtual machine search index.

In some embodiments, as each snapshot of a virtual machine is ingested, each virtual disk associated with the virtual machine is parsed in order to identify a file system type associated with the virtual disk and to extract metadata (e.g., file system metadata) for each file stored on the virtual disk. The metadata may include information for locating and retrieving each file from the virtual disk. The metadata may also include a name of a file, the size of the file, the last time at which the file was modified, and a content checksum for the file. Each file that has been added, deleted, or modified since a previous snapshot was captured may be determined using the metadata (e.g., by comparing the time at which a file was last modified with a time associated with the previous snapshot). Thus, for every file that has existed within any of the snapshots of the virtual machine, a virtual machine search index may be used to identify when the file was first created (e.g., corresponding with a first version of the file) and at what times the file was modified (e.g., corresponding with subsequent versions of the file). Each version of the file may be mapped to a particular version of the virtual machine that stores that version of the file.

In some embodiments, if a virtual machine includes a plurality of virtual disks, then a virtual machine search index may be generated for each virtual disk of the plurality of virtual disks. For example, a first virtual machine search index may catalog and map files located on a first virtual disk of the plurality of virtual disks and a second virtual machine search index may catalog and map files located on a second virtual disk of the plurality of virtual disks. In this case, a global file catalog or a global virtual machine search index for the virtual machine may include the first virtual machine search index and the second virtual machine search index. A global file catalog may be stored for each virtual machine backed up by a storage appliance within a file system, such as distributed file system 312 in FIG. 3.

In various embodiments, the software layer (e.g., integrated software stack), as illustrated in FIG. 3, may run on other computing devices, including a server, such as a cloud server within the SaaS platform 140 in FIG. 1A. In various embodiments, the proxy agent 152 residing in the data center 104 may invoke any of the functionalities of data management system 302, virtualization interface 304, the distributed job scheduler 308, the distributed metadata store 310, and the distributed file system 312 as described herein to facilitate execution of the operations as described in FIG. 5 and FIG. 6.

In various embodiments, the functionalities provided by the software layer, as illustrated in FIG. 3, may also be provided by (or provided via) the snapshot tool 180 in the client compute environment 160.

Figure 4:
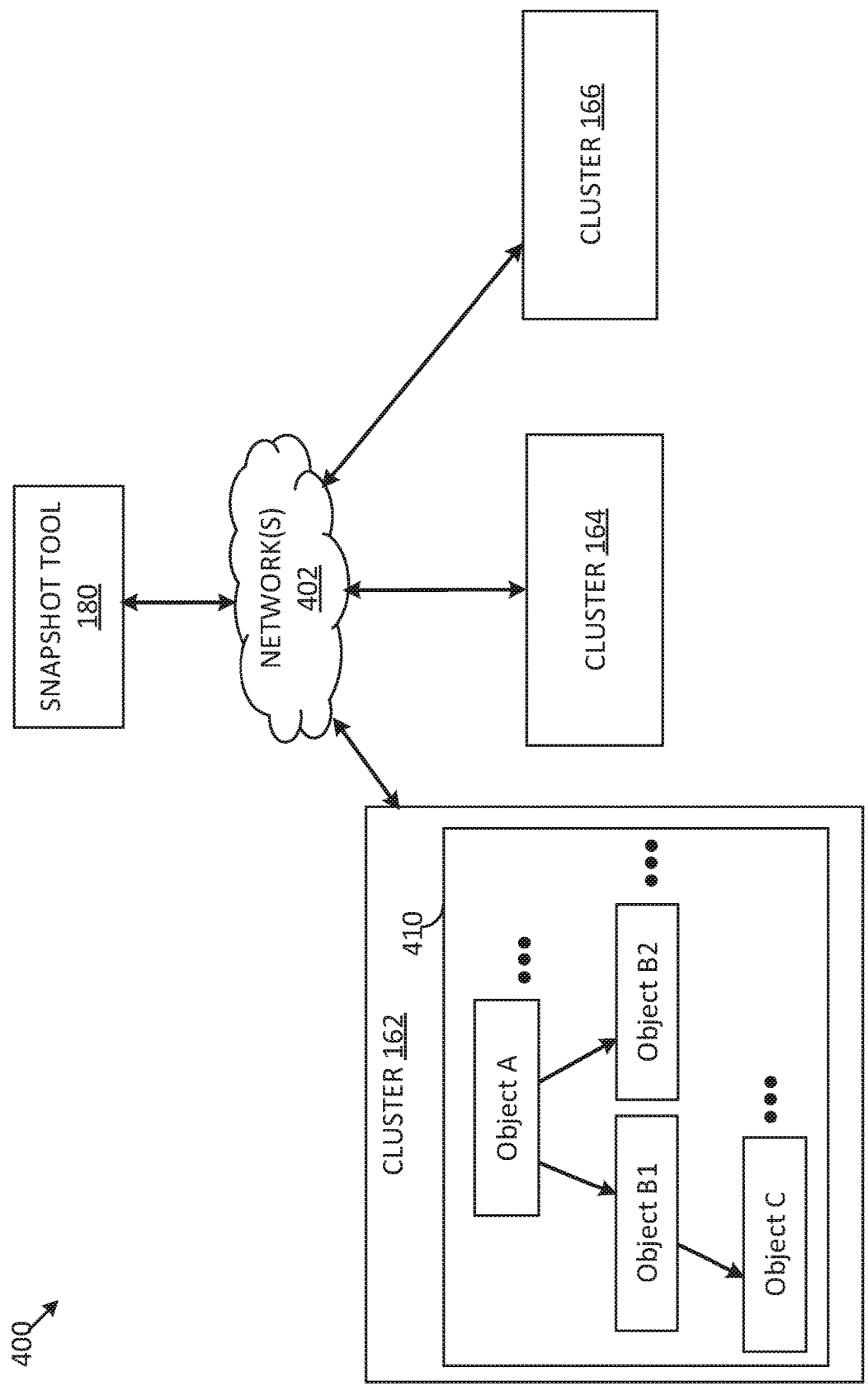
FIG. 4 depicts a block diagram illustrating an example client compute environment of FIG. 1A, according to some embodiments.

FIG. 4 depicts a block diagram 400 illustrating the client compute environment 160 of FIG. 1A, according to some embodiments. The client compute environment 160 include a snapshot tool 180 and a number of clusters that manage containerized applications. The snapshot tool 180 and the number of clusters are in communication with each other via one or more networks 402. The number of clusters includes cluster 162, cluster 164, and cluster 166, as illustrated in FIG. 4. The snapshot tool 180 is in communication with the object data backup and restore system 150. In various embodiments, object data backup and restore system 150 instructs the snapshot tool 180 via the proxy agent 152 to execute various operations as described in FIG. 5 and FIG. 6.

In various embodiments, as illustrated in FIG. 4, cluster 162 includes a number of objects, including object A, object B1, object B2, and object C. Object A may be a different type of object compared to objects B1 and B2, and be a different type of object compared to object C. In the example relationship graph 410, an object at a higher level (e.g., object A) may own one or more objects at a lower level. For example, object A owns object B1 and object B2, and object B1 owns object C. The hierarchy of objects representing object dependencies may be defined by a cluster configuration associated with the cluster (e.g., cluster 162). The cluster configuration may be pre-determined by a cluster administrator. In various embodiments, cluster 162 manages containerized applications. Cluster 162 may include one or more of sub-clusters. Each sub-cluster may include one or more nodes. The relationship graph 410, as illustrated in FIG. 4, includes objects that run on a node (not shown) or a sub-cluster (not shown) of cluster 162.

In various embodiments, depending on the type of dependency relationships, restoring object C may require the system also to revise (or restore) object B1. The object data backup and restore system may identify the metadata associated with each object to determine object dependencies, and generate a relationship graph to include only necessary additional objects in the cluster that need to be restored in order to restore the target object at run time. Example types of metadata associated with objects include key or value pair, object dependency indicator, directory indicator, and delete option indicator. Specifically, key or value pair may be associated with an object at creation time and be subsequently added and modified. The key or value pair allows users to identify attributes of the object for queries. Object dependency indicator (e.g., owner reference) represents ownership and dependency relationships between objects. In various embodiments, when an owner object (e.g., object A) is deleted, its dependent objects (e.g., object B1, object B2 and object B3) may be automatically deleted. Directory indicator (e.g., volume mounts), represents the type of directory and for which object the directory (e.g., volume) is being mounted. A directory is accessible by containers in an object. Delete option indicator (e.g., finalizer) is used on a directory (e.g., volume) to prevent accidental deletion.

In various embodiments, the snapshot tool may be an agent or a data component (e.g., module) installed in the cluster. The snapshot tool may include a number of data units (not shown). Each data unit is responsible for executing a particular type of operation, such as operations as described in FIG. 5 and FIG. 6.

Figure 5:
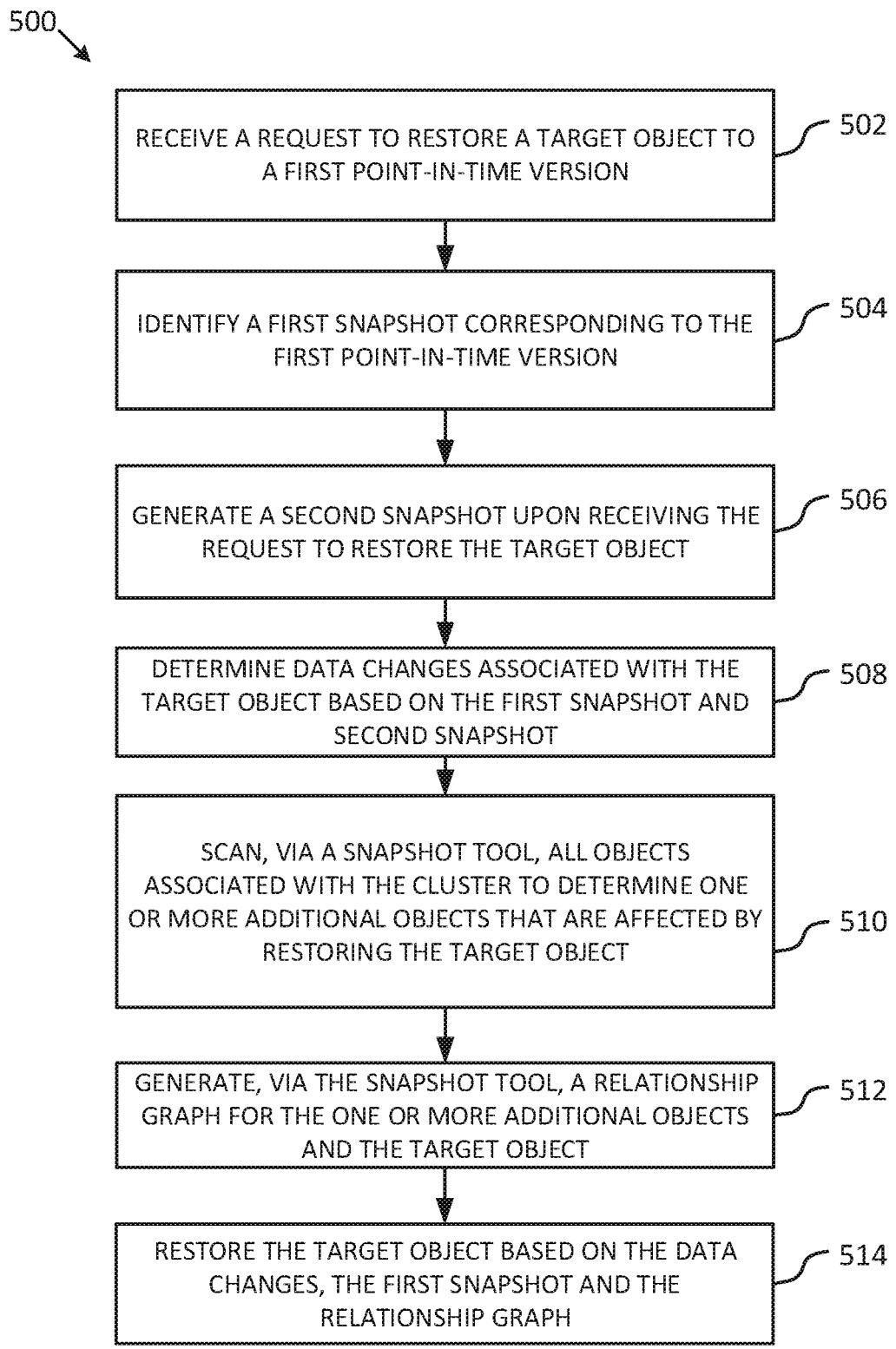
FIG. 5 depicts a block diagram illustrating example object data backup and restore operations in a method, according to some embodiments.

FIG. 5 depicts a block diagram illustrating example object data backup and recovery operations in a method 500, according to some embodiments. The operations of method 500 may be performed by any number of different systems, such as the object data backup and restore system 150 as described herein, or any component thereof, such as a processor included in any of the systems. In various embodiments, the operations of method 500 may also be performed by the snapshot tool 180 installed in the client compute environment 160 in response to respective instructions received from the object data backup and restore system 150.

Example methods described herein may also be implemented in the form of executable instructions stored on a machine-readable medium or in the form of electronic circuitry. For instance, the operations of method 500 may be represented by executable instructions that, when executed by a processor of a computing device, cause the computing device to perform method 500. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

At operation 502, the processor receives a request to restore a target object to a first point-in-time version. An example target object may be object C, as illustrated in FIG. 4. A target object may be included in a node, a subcluster of a cluster, or a cluster, such as cluster 162.

At operation 504, the processor identifies a first snapshot of the cluster corresponding to the first point-in-time version. In various embodiments, the first snapshot may be taken for the cluster (e.g., cluster 162), an associated sub-cluster, or a node that includes the target object. The first snapshot is taken at a timestamp that is associated with the first point-in-time version of the target object.

At operation 506, the processor generates a second snapshot of the cluster upon receiving the request to restore the target object to the first point-in-time version.

At operation 508, the processor determines data changes associated with the target object based on the first snapshot and second snapshot. Specifically, in various embodiments, the processor compares the data associated with the target object in both the first snapshot and the second snapshot, and identifies the delta changes to disks representing the data changes that occurred to since the first snapshot was taken.

At operation 510, the processor uses the snapshot tool 180 to scan all the objects in the cluster (e.g., cluster 162) to determine one or more additional objects affected by restoring the target object due to object dependencies defined by the cluster configuration. An example of the additional objects may be object B1, object B2, and object A, as illustrated in FIG. 4. In various embodiments, the determination of one or more additional objects may be based on identifying the type of metadata associated with each object in the cluster.

At operation 512, the processor uses the snapshot tool 180 to generate a relationship graph (e.g., relationship graph 410) to include the determined one or more additional objects and the target object.

At operation 514, the processor restores the target object based on the data changes, the first snapshot, and the relationship graph. Specifically, the processor may restore the target object using the first snapshot with the applied data changes and restore the additional objects that own or depend on the target object based on the object dependencies. This way, the object specification of each affected object in the cluster is maintained, that the restoration of the target object may be performed on the fly (e.g., at run time). In various embodiments, the processor restores the target object based on data associated with the target object from the first snapshot in conjunction with data associated with one or more additional objects from the second snapshot. The processor may modify the data associated with the additional objects from the second snapshot to maintain dependencies between the target object and additional objects.

In various embodiments, the object specification is defined based on a user request or a system-generated request.

In various embodiments, the data changes are associated with one or more definitions of an object specification in YAML format or JSON format. The object specification describes the object dependencies defined by the cluster configuration.

In various embodiments, the processor uses a customized object restore plugin to restore the target object based on the first snapshot, the data changes, and the relationship graph. The customized object restore plugin is responsible for handling each object type based on how each type of object may affect other types. The customized object restore plugin is able to filter, modify and maintain the objects to ensure that the cluster will accept the resulting set of objects based on the associated cluster configuration. In various embodiments, the customized object restore plugin is provided by the object data backup and restore system, or it may be provided by a third-party system that is communicatively coupled to the object data backup and restore system 150. In various embodiment, at the time of the restore, the processor replaces persistent volume claims of an instance of an object (e.g., pod) based on the first snapshot, and restores one or more annotations associated with an instance of a running object (e.g., a deployment)

Figure 6:
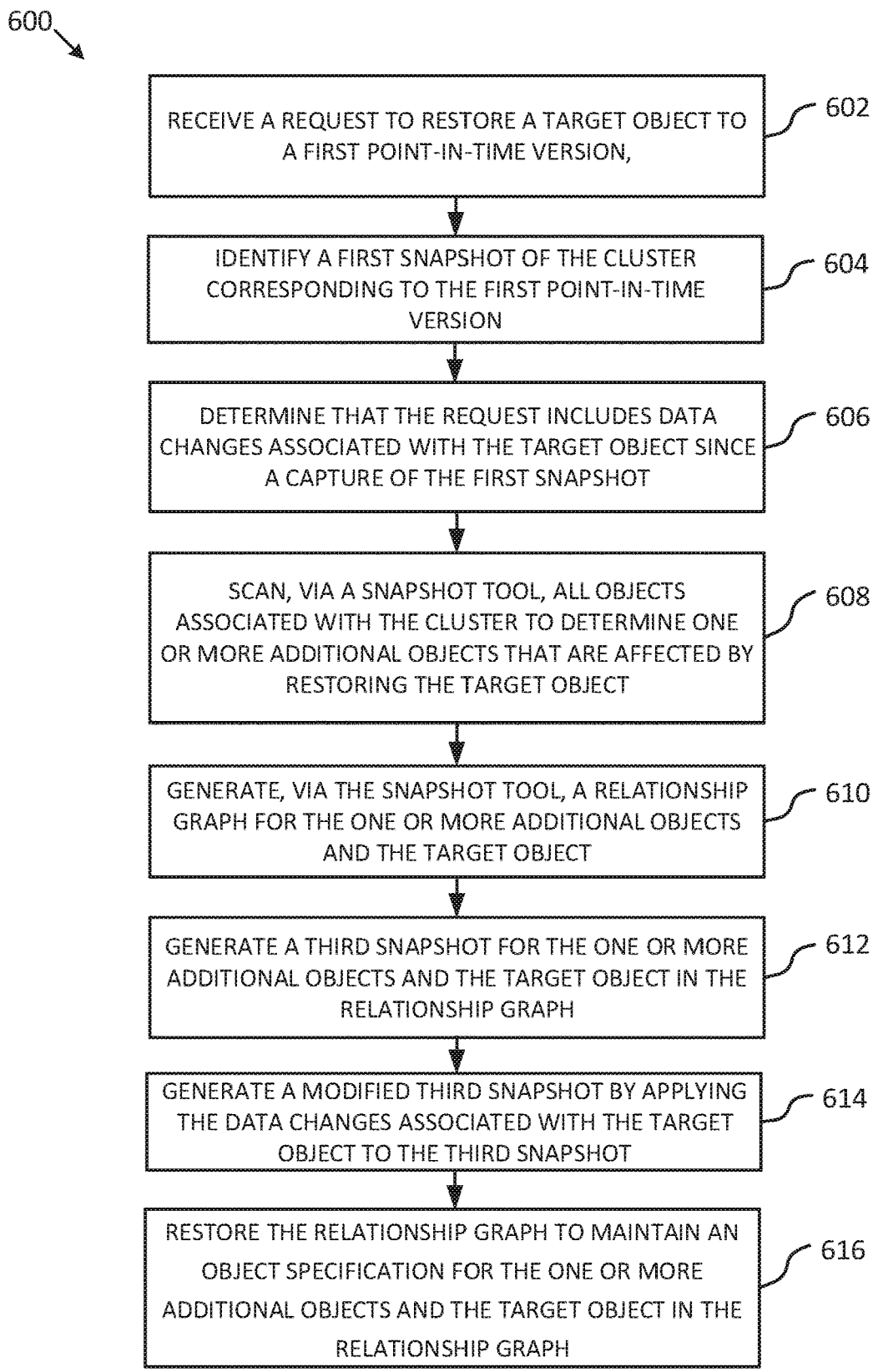
FIG. 6 depicts a block diagram illustrating example object data backup and restore operations in a method, according to some embodiments.

FIG. 6 depicts a block diagram illustrating example object data backup and recovery operations in a method 600, according to some embodiments. The operations of method 600 may be performed by any number of different systems, such as the object data backup and restore system 150 as described herein, or any component thereof, such as a processor included in any of the systems. In various embodiments, the operations of method 600 may also be performed by the snapshot tool 180 installed in the client compute environment 160 in response to respective instructions received from the object data backup and restore system 150.

Example methods described herein may also be implemented in the form of executable instructions stored on a machine-readable medium or in the form of electronic circuitry. For instance, the operations of method 600 may be represented by executable instructions that, when executed by a processor of a computing device, cause the computing device to perform method 600. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

At operation 602, the processor receives a request to restore a target object to a first point-in-time version. An example target object may be object C, as illustrated in FIG. 4. A target object may be included in a node, a subcluster of a cluster, or a cluster, such as cluster 162.

At operation 604, the processor identifies a first snapshot of the cluster corresponding to the first point-in-time version. In various embodiments, the first snapshot may be taken for the cluster (e.g., cluster 162), an associated subcluster, or a node that includes the target object. The first snapshot is taken at a timestamp that is associated with the first point-in-time version of the target object.

At operation 606, the processor determines that the request to restore the target object includes the data changes associated with the target object since the capture of the first snapshot. In various embodiments, the data changes may be identified by a user or by a component of any of the systems as described herein.

At operation 608, the processor scans all the objects in the cluster (e.g., cluster 162) to determine one or more additional objects affected by restoring the target object due to object dependencies defined by the cluster configuration. An example of the additional objects may be object B1, object B2, and object A, as illustrated in FIG. 4. In various embodiments, the determination of one or more additional objects may be based on identifying the type of metadata associated with each object in the cluster.

At operation 610, the processor generates a relationship graph (e.g., relationship graph 410) for the determined one or more additional objects and the target object.

At operation 612, upon determining the one or more additional objects affected by restoring the target object, the processor uses the snapshot tool to generate a third snapshot for the one or more additional objects and the target object in the relationship graph. Under this approach, a snapshot is taken for only a limited number of objects that will be affected by the restoration of the target object, saving compute resources and storage space.

At operation 614, the processor generates a modified third snapshot by applying the data changes associated with the target object to the third snapshot.

At operation 616, the processor restores the target object using the modified third snapshot, and restores the relationship graph to maintain an object specification for the one or more additional objects and the target object in the relationship graph.

In various embodiments, the processor may use snapshot tool 180 as a local agent running in the client compute environment to perform any one of the operations as described in method 500 and method 600.

In various embodiments, an authentication process is performed when a user installs the snapshot tool 180 in the client compute environment.

In various embodiments, a protection mechanism is implemented to prevent unintended changes caused by the data center 104 when data is passed through or processed by the proxy agent 152.

Figure 7:
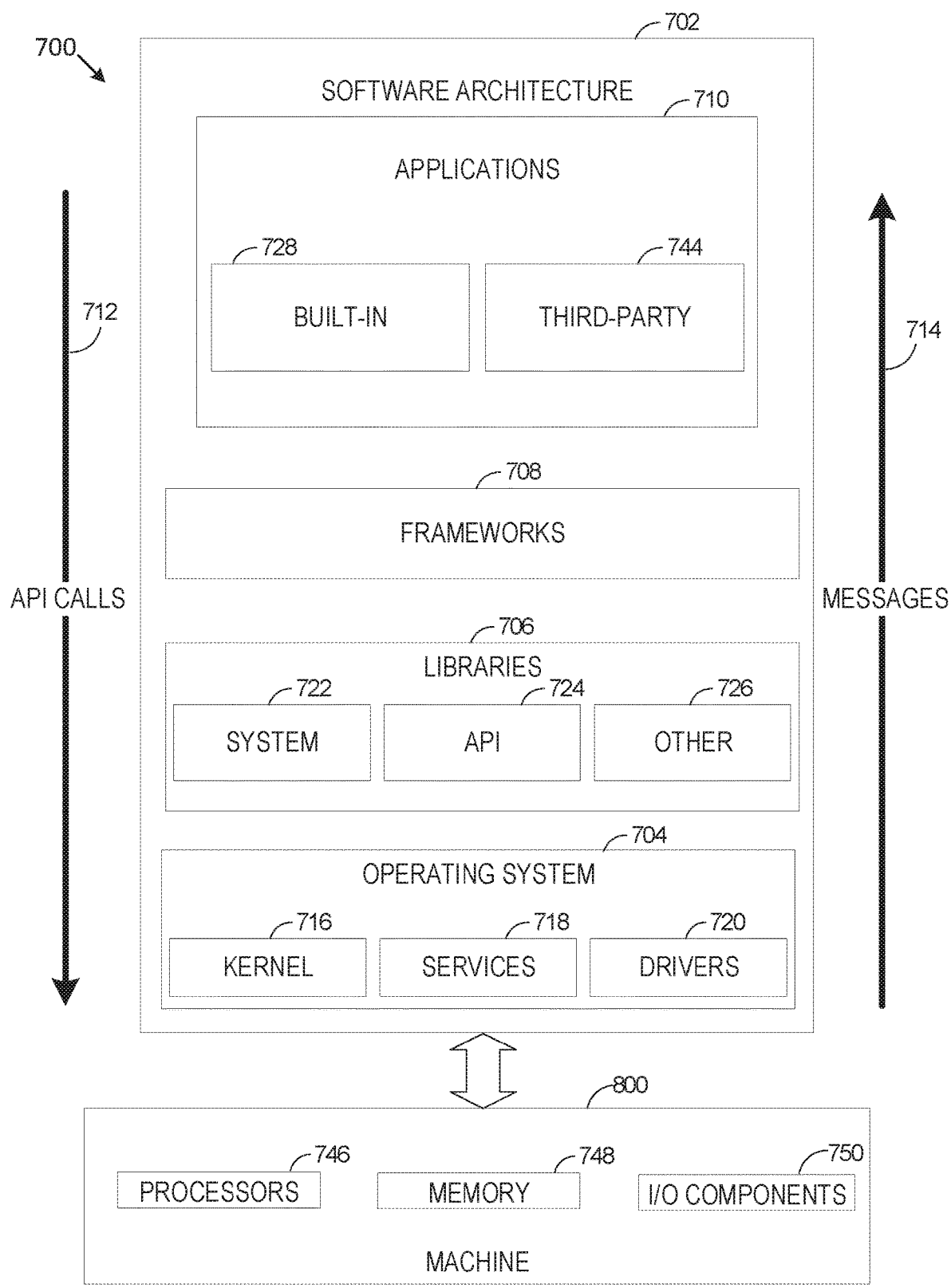
FIG. 7 depicts a block diagram illustrating an architecture of software, according to some embodiments.

FIG. 7 is a block diagram 700 illustrating an architecture of software 702, which can be installed on any one or more of the devices described above. FIG. 7 is merely a non-limiting example of a software architecture, and it will be appreciated that many other architectures can be implemented to facilitate the functionality described herein. In various embodiments, the software 702 is implemented by hardware such as a machine 800 of FIG. 8 that includes processor(s) 746, memory 748, and I/O components 750. In this example architecture, the software 702 can be conceptualized as a stack of layers where each layer may provide a particular functionality. For example, the software 702 includes layers such as an operating system 704, libraries 706, frameworks 708, and applications 710. Operationally, the applications 710 invoke API calls 712 (application programming interface) through the software stack and receive messages 714 in response to the API calls 712, consistent with some embodiments.

In various implementations, the operating system 704 manages hardware resources and provides common services. The operating system 704 includes, for example, a kernel 716, services 718, and drivers 720. The kernel 716 acts as an abstraction layer between the hardware and the other software layers, consistent with some embodiments. For example, the kernel 716 provides memory management, processor management (e.g., scheduling), component management, networking, and security settings, among other functionality. The services 718 can provide other common services for the other software layers. The drivers 720 are responsible for controlling or interfacing with the underlying hardware, according to some embodiments. For instance, the drivers 720 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 706 provide a low-level common infrastructure utilized by the applications 710. The libraries 706 can include system libraries 722 (e.g., C standard library) that can provide functions such as memory allocation functions, string manipulation functions, mathematic functions, and the like. In addition, the libraries 706 can include API libraries 724 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 706 can also include a wide variety of other libraries 726 to provide many other APIs to the applications 710.

The frameworks 708 provide a high-level common infrastructure that can be utilized by the applications 710, according to some embodiments. For example, the frameworks 708 provide various graphical user interface (GUI) functions, high-level resource management, high-level location services, and so forth. The frameworks 708 can provide a broad spectrum of other APIs that can be utilized by the applications 710, some of which may be specific to a particular operating system or platform.

In an embodiment, the applications 710 include built-in applications 728 and a broad assortment of other applications, such as a third-party application 744. The built-in applications 728 may include a home application, a contacts application, a browser application, a book reader application, a location application, a media application, a messaging application, a game application. According to some embodiments, the applications 710 are programs that execute functions defined in the programs. Various programming languages can be employed to create one or more of the applications 710, structured in a variety of manners, such as object-oriented programming languages (e.g., Objective-C, Java, or C++) or procedural programming languages (e.g., C or assembly language). In a specific example, the third-party application 744 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 744 can invoke the API calls 712 provided by the operating system 704 to facilitate functionality described herein.

Figure 8:
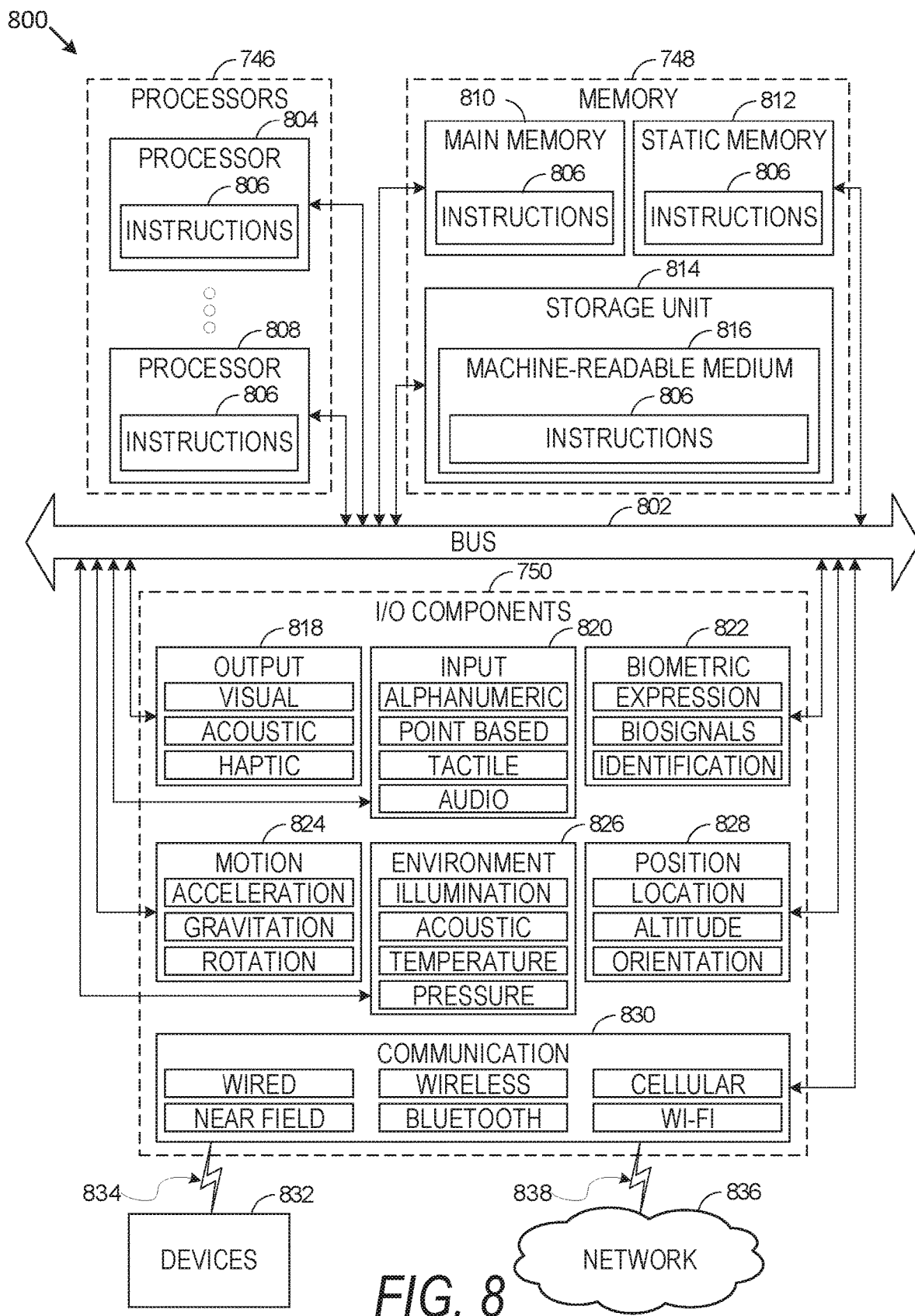
FIG. 8 illustrates a diagrammatic representation of a machine in the form of a computer system within which a set of instructions may be executed for causing a machine to perform any one or more of the methodologies discussed herein, according to some embodiments.

FIG. 8 illustrates a diagrammatic representation of a machine 800 in the form of a computer system within which a set of instructions may be executed for causing the machine to perform any one or more of the methodologies discussed herein, according to some embodiments. Specifically, FIG. 8 shows a diagrammatic representation of the machine 800 in the example form of a computer system, within which instructions 806 (e.g., software, a program, an application, an applet, an app, or other executable code) for causing the machine 800 to perform any one or more of the methodologies discussed herein may be executed. Additionally, or alternatively, the instructions 806 may implement the operations of method 500 shown in FIG. 5 and the operations of method 600 shown in FIG. 6, or as elsewhere described herein.

The instructions 806 transform the general, non-programmed machine 800 into a particular machine 800 programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 806, sequentially or otherwise, that specify actions to be taken by the machine 800. Further, while only a single machine 800 is illustrated, the term "machine" shall also be taken to include a collection of machines 800 that individually or jointly execute the instructions 806 to perform any one or more of the methodologies discussed herein.

The machine 800 may include processor(s) 746, memory 748, and I/O components 750, which may be configured to communicate with each other such as via a bus 802. In some embodiments, the processor(s) 746 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 804 and a processor 808 that may execute the instructions 806. The term "processor" is intended to include multi-core processors that may comprise two or more independent processors (sometimes referred to as "cores") that may execute instructions contemporaneously. Although FIG. 8 shows multiple processor(s) 746, the machine 800 may include a single processor with a single core, a single processor with multiple cores (e.g., a multi-core processor), multiple processors with a single core, multiple processors with multiples cores, or any combination thereof.

The memory 748 may include a main memory 810, a static memory 812, and a storage unit 814, each accessible to the processor(s) 746 such as via the bus 802. The main memory 810, the static memory 812, and storage unit 814 store the instructions 806 embodying any one or more of the methodologies or functions described herein. The instructions 806 may also reside, completely or partially, within the main memory 810, within the static memory 812, within the storage unit 814, within at least one of the processor(s) 746 (e.g., within the processor's cache memory), or any suitable combination thereof, during execution thereof by the machine 800.

The I/O components 750 may include a wide variety of components to receive input, provide output, produce output, transmit information, exchange information, capture measurements, and so on. The specific I/O components 750 that are included in a particular machine will depend on the type of machine. For example, portable machines such as mobile phones will likely include a touch input device or other such input mechanisms, while a headless server machine will likely not include such a touch input device. It will be appreciated that the I/O components 750 may include many other components that are not shown in FIG. 8. The I/O components 750 are grouped according to functionality merely for simplifying the following discussion and the grouping is in no way limiting. In some embodiments, the I/O components 750 may include output components 818 and input components 820. The output components 818 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 820 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In some embodiments, the I/O components 750 may include biometric components 822, motion components 824, environmental components 826, or position components 828, among a wide array of other components. For example, the biometric components 822 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 824 may include acceleration sensor components (e.g., accelerometer), gravitation sensor components, rotation sensor components (e.g., gyroscope), and so forth. The environmental components 826 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 828 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 750 may include communication components 830 operable to couple the machine 800 to a network 836 or devices 832 via a coupling 838 and a coupling 834, respectively. For example, the communication components 830 may include a network interface component or another suitable device to interface with the network 836. In further examples, the communication components 830 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 832 may be another machine or any of a wide variety of peripheral devices (e.g., a peripheral device coupled via a USB).

Moreover, the communication components 830 may detect identifiers or include components operable to detect identifiers. For example, the communication components 830 may include Radio Frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 830, such as location via Internet Protocol (IP) geolocation, location via Wi-Fi® signal triangulation, location via detecting an NFC beacon signal that may indicate a particular location, and so forth.

The various memories (i.e., memory 748, main memory 810, and/or static memory 812) and/or storage unit 814 may store one or more sets of instructions and data structures (e.g., software) embodying or utilized by any one or more of the methodologies or functions described herein. These instructions (e.g., the instructions 806), when executed by processor(s) 746, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In some embodiments, one or more portions of the network 836 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 836 or a portion of the network 836 may include a wireless or cellular network, and the coupling 838 may be a Code Division Multiple Access (CDMA) connection, a Global System for Mobile communications (GSM) connection, or another type of cellular or wireless coupling. In this example, the coupling 838 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 806 may be transmitted or received over the network 836 using a transmission medium via a network interface device (e.g., a network interface component included in the communication components 830) and utilizing any one of a number of well-known transfer protocols (e.g., hypertext transfer protocol (HTTP)). Similarly, the instructions 806 may be transmitted or received using a transmission medium via the coupling 834 (e.g., a peer-to-peer coupling) to the devices 832. The terms "non-transitory computer-readable storage medium," "transmission medium" and "signal medium" mean the same thing and may be used interchangeably in this disclosure. The terms "transmission medium" and "signal medium" shall be taken to include any intangible medium that is capable of storing, encoding, or carrying the instructions 806 for execution by the machine 800, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

The terms "machine-readable medium," "non-transitory computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

Although examples have been described with reference to some embodiments or methods, it will be evident that various modifications and changes may be made to these embodiments without departing from the broader scope of the embodiments. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This detailed description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:
1. A method comprising:
receiving, at a first time, a request to restore a target object to a first point-in-time version, the target object being associated with a cluster;
identifying a first snapshot of the cluster corresponding to the first point-in-time version;

generating, at a second time that is at or subsequent to the first time, a second snapshot of the cluster upon receiving the request to restore the target object;

determining data changes associated with the target object based on the first snapshot and the second snapshot;

scanning, via a snapshot tool, all objects associated with the cluster to determine one or more additional objects that are affected by restoring the target object due to object dependencies defined by a cluster configuration;

generating, via the snapshot tool, a relationship graph for the one or more additional objects and the target object; and restoring the target object based on the data changes, the first snapshot and the relationship graph.

2. The method of claim 1, further comprising:
restoring the relationship graph to maintain an object specification for the one or more additional objects and the target object in the relationship graph.

3. The method of claim 2, wherein the object specification is defined based on a user request or a system-generated request.

4. The method of claim 1, further comprising:
determining that the request includes the data changes associated with the target object since a capture of the first snapshot.

5. The method of claim 4, further comprising:
instead of generating the second snapshot of the cluster, generating a third snapshot for the one or more additional objects and the target object in the relationship graph upon determining the one or more additional objects are affected by restoring the target object;

generating a modified third snapshot by applying the data changes associated with the target object to the third snapshot; and restoring the target object using the modified third snapshot.

6. The method of claim 5, further comprising:
restoring the relationship graph to maintain an object specification for the one or more additional objects and the target object in the relationship graph.

7. The method of claim 1, wherein the relationship graph represents the object dependencies between the one or more additional objects and the target object.

8. The method of claim 1, wherein the data changes are associated with one or more definitions of an object specification in YAML format or JSON format, and wherein the object specification describes the object dependencies defined by the cluster configuration.

9. The method of claim 1, wherein restoring the target object using the first snapshot and the relationship graph comprises:
using a customized object restore plugin to restore the target object using the first snapshot and the relationship graph.

10. The method of claim 1, wherein the cluster manages containerized applications, wherein the target object is a data unit operating on a node in the cluster, and wherein the target object corresponds to a request to consume resources on the cluster.

11. A system comprising:
a memory storing instructions; and
one or more hardware processors communicatively coupled to the memory and configured by the instructions to perform operations comprising:
receiving, at a first time, a request to restore a target object to a first point-in-time version, the target object being associated with a cluster;

identifying a first snapshot of the cluster corresponding to the first point-in-time version;

generating, at a second time that is at or subsequent to the first time, a second snapshot of the cluster upon receiving the request to restore the target object;

determining data changes associated with the target object based on the first snapshot and the second snapshot;

scanning, via a snapshot tool, all objects associated with the cluster to determine one or more additional objects that are affected by restoring the target object due to object dependencies defined by a cluster configuration;

generating, via the snapshot tool, a relationship graph for the one or more additional objects and the target object; and restoring the target object based on the data changes, the first snapshot and the relationship graph.

12. The system of claim 11, wherein the operations further comprise:
restoring the relationship graph to maintain an object specification for the one or more additional objects and the target object in the relationship graph.

13. The system of claim 12, wherein the object specification is defined based on a user request or a system-generated request.

14. The system of claim 11, wherein the operations further comprise:
determining that the request includes the data changes associated with the target object since a capture of the first snapshot.

15. The system of claim 14, wherein the operations further comprise:
instead of generating the second snapshot of the cluster, generating a third snapshot for the one or more additional objects and the target object in the relationship graph upon determining the one or more additional objects are affected by restoring the target object;

generating a modified third snapshot by applying the data changes associated with the target object to the third snapshot; and restoring the target object using the modified third snapshot.

16. The system of claim 15, wherein the operations further comprise:
restoring the relationship graph to maintain an object specification for the one or more additional objects and the target object in the relationship graph.

17. The system of claim 11, wherein the relationship graph represents the object dependencies between the one or more additional objects and the target object.

18. The system of claim 11, wherein the data changes are associated with one or more definitions of an object specification in YAML format or JSON format, and wherein the object specification describes the object dependencies defined by the cluster configuration.

19. The system of claim 11, wherein restoring the target object using the first snapshot and the relationship graph comprises:
using a customized object restore plugin to restore the target object using the first snapshot and the relationship graph.

20. The system of claim 11, wherein the cluster manages containerized applications, wherein the target object is a data unit operating on a node in the cluster, and wherein the target object corresponds to a request to consume resources on the cluster.

\* \* \* \* \*